Sept. 10, 1935.  E. C. MOGFORD ET AL  2,013,786
AXLE
Filed May 10, 1930
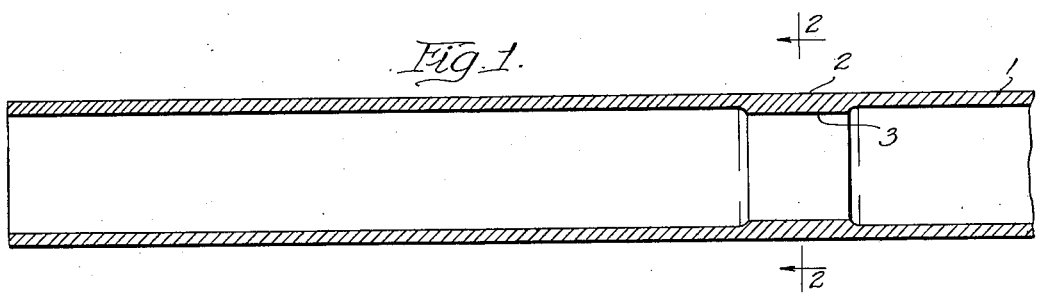
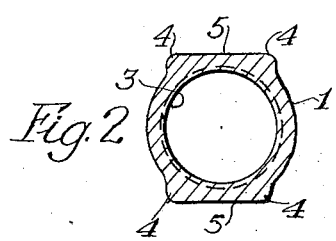
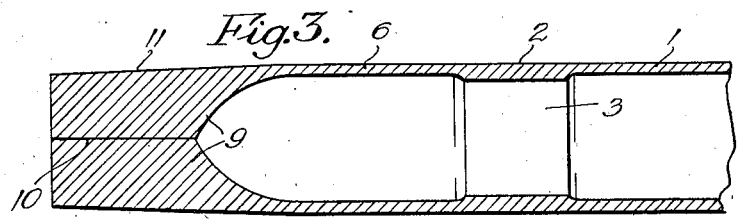
Inventors:
Edmund C. Mogford
George Spatta
By
Atty's Patented Sept. 10, 1935

2,013,786

UNITED STATES PATENT OFFICE 2,013,786

AXLE

Edmund C. Mogford and George Spatta, Buchanan, Mich., assignors to Clark Equipment Company, Buchanan, Mich., a corporation of Michigan Application May 10, 1930, Serial No. 451,230

3 Claims. (Cl. 301—124)

Our invention relates to tubular front axles for automobiles and the like.

In automotive engineering, tubular front axles of the general type set out in our Patent No. 1,899,347, issued February 28, 1933, have made a distinct improvement because of the material reduction in unsprung weight accomplished through their use. In our Patent No. 1,873,453, issued July 23, 1932 we disclose a method of making tubular axles of this type, this method broadly being an improvement upon our prior copending application.

In the instant application, we disclose a tubular front axle of the reversed Elliot type in which the knuckle piece is forged integral with the axle proper, the axle being preferably formed in the manner outlined in our above mentioned patents. This construction results in a further reduction in the weight of the axle and consequently a reduction in the unsprung weight to be carried by the car. The axle made in accordance with the teachings of the instant invention is less expensive both as to material cost and as to labor cost.

Axles of the type made within the teachings of the instant application comprise a steel tubing having an outside diameter and length determined by the particular axle being constructed and having a wall thickness of approximately three-sixteenths of an inch. The operations of forming the axle, outlined in detail in our above mentioned patents, consist of a series of endwise upsetting operations which close the end of the tube for an appreciable distance, the walls of the closed end being subsequently forged together and shaped to form the knuckle piece of the axle.

In the manufacture of an axle of the forged type within the teachings of this invention, a spring seat boss is formed in the tube by endwise upsetting, which operation thickens the walls and forms protuberances or bosses on the top and bottom sides of the axle, which bosses form square seating surfaces against which the shoulder and nut of the spring hanger are abutted. In manufacturing axles for cars equipped with semielliptic front springs, these abutment supports are not formed and suitable spring seats for the particular type of spring are attached to the axle member, in any preferred manner, such as by welding.

Axles formed in accordance with the teachings of the present invention are lithe, strong, and of pleasing appearance. This reduction in weight for a given strength of axle materially reduces the unsprung weight of the car and as a result minimizes the wear on the tires and running gear of the car.

Now to acquaint those skilled in the art with the teachings of this invention, reference is made to the accompanying drawing in which a preferred embodiment of it is shown by way of example and in which:

Figure 1 is a cross-sectional view taken lengthwise through the tubular blank at the completion of the upsetting of the walls of the blank beneath the spring support;

Figure 2 is a cross-sectional view of Figure 1 taken along the line 2—2 looking in the direction of arrows and showing bosses raised in the outside surface of the blank to form flat faces on the top and bottom sides of the axle; and Figure 3 is a view of the blank shown in Figure 1 taken at the completion of the upsetting and swaging operations on the adjacent end of the blank.

Referring to the drawing, now, in more detail, the front axle is made from a piece of seamless tubing of a diameter dependent upon the particular type of axle being constructed and of a length sufficient to supply the metal that is required in the fabrication of the axle. In the axle shown in the drawing, which is shown by way of example, the tube is two and one-half inches in diameter and has a wall thickness of three-sixteenths of an inch.

The first operation performed upon this blank is heating it at the point at which the spring supporting means is to be subsequently attached; the walls of the blank I then being gripped in a suitable forging die and upset at a point 2 through the operation of a punch associated with that die. The particular type of punch and die employed for this operation is not of the essence of the present invention and is therefore omitted from the drawing. Preferably, however, the punch and die are formed so that the walls of the blank I are thickened by moving metal inward to form an inner ring 3, this operation being performed simultaneous with a slight increase of the outside perimeter of the blank by the formation of the shoulders 4.

In certain types of front axles, particularly those in which the spring on which the chassis of the vehicle is supported runs parallel to the longitudinal axis of the axle, it is customary to attach the spring to the axle by a hanger which has a bolt forged integral with it. This bolt projects through the axle itself, and is held thereon by a nut and washer on the underside of the axle.

To mount this type of a housing, the upsetting operation which thickens the walls at the point 2 is also employed to form the bosses 4 on the outside surface of the tubular blank. This is accomplished by compression of the blank to bow the bosses 4 outwardly as the wall thickness is increased. The shortening of the blank produces the excess metal which is bulged or extruded outwardly to form the bosses by compression of the blank during the upsetting operation. These bosses and the peripheral surface of the blank together form flat surfaces 5 on the upper and lower faces of the axle, the upper face serving as a square seat for the shoulder on the hanger bolt and the lower face as a seat for the washer and nut employed to lock that bolt on the axle. These raised portions preferably have a thickness of the order of twice the thickness of the adjacent wall 3 of the tube, as shown in Figure 2. However, this ratio of thickness may vary, depending upon the particular requirements that are encountered in the use of the axle. By suitable arrangement of the die, we form these bosses 4 on the blank at the same time that we upset that blank to thicken its walls as shown at 3 in Figure 1. In this embodiment of our invention the perimeter of the blank is actually increased by the upsetting operation, metal being gathered through a shortening of the blank to form this increased perimeter and to simultaneously thicken the walls. The increased thickness of the walls supplies sufficient strength to compensate for the drilling of the tubular housing to permit the insertion of the hanger bolt therein.

Upon the completion of the upsetting operation just described, the end sections of the axle are then heated to forging temperature, and the blank is then clamped in a suitable die preparatory to upsetting these end sections to shorten them and thicken their walls. Since the amount of metal to be moved is more than can be successfully moved in a single operation, we propose to perform this upsetting of the arm in a plurality of steps, all of which is accomplished during one heating of the section, that is, the successive steps are performed with sufficient rapidity and with the loss of only so much heat that all may be completed before the blank has had time to cool sufficiently to necessitate its being reheated to the proper forging temperature.

The blank is first thickened by successive upsetting operations to the form shown in Figure 3, and then moved to a swaging die which engages the outer surface of the arm 6 and forms the thickened end of it into a tapered portion 11, shown in Figure 3. This tapering may be on a circular section but preferably is on an oblong section such as an ellipse or a flattened ellipse. It will be noted that the enlargement 9 is lengthened by this swaging operation.

The particular dies, punches and clamps employed in the performance of these end upsetting operations, are not of the essence of the present invention and have been omitted from the drawing as unnecessary.

Axles constructed in accordance with the foregoing operation are materially lighter than either the solid forged I-beam axles commonly used heretofore and also lighter than the tubular axles disclosed in the above mentioned patents of Mogford and Spatta.

Having thus described our invention what we consider new and desire to have protected by Letters Patent is pointed out in the appended claims.

What is claimed is:—

1. An automobile axle comprising a thin walled tube having a spring seat adjacent an end thereof, the thickness of the tube in the region of the seat being increased to provide integral raised portions on the outer surface of the tube, and opposite sides of the tube being outwardly bulged by compression.

2. An automobile axle comprising a thin walled cylindrical tube having a spring seat adjacent an end thereof, the tube being internally thickened at said spring seat and having outwardly bulged integral boss portions forming parallel flat seating surfaces at the top and bottom of said tube.

3. An automobile axle comprising a thin walled cylindrical tube having a spring seat adjacent the end thereof, the annular thickness of the tube in the region of the seat being increased internally of the tube to a thickness substantially greater than the normal thickness of the tube, and said tube having opposed integral outwardly bulged portions at said seat to provide parallel flattened seating surfaces spaced apart a distance at least equal to the diameter of the cylindrical portion of said tube.

EDMUND C. MOGFORD.
GEORGE SPATTA.